United States Patent [19]

Craig

[11] 4,348,445

[45] Sep. 7, 1982

[54] REINFORCED FILM OF A COMBINATION OF THERMOPLASTIC NETTING AND ORIENTED FILM

[75] Inventor: Alan D. Craig, Wilmington, Del.

[73] Assignee: Hercules Incorporated, Wilmington, Del.

[21] Appl. No.: 299,753

[22] Filed: Sep. 8, 1981

[51] Int. Cl.³ .............................................. B32B 5/12
[52] U.S. Cl. .................................... 428/138; 156/161; 156/244.12; 156/244.19; 156/285; 156/290; 156/306.6; 428/247; 428/252; 428/255
[58] Field of Search ............... 428/137, 138, 247, 252, 428/255; 156/161, 244.12, 244.19, 285, 290, 306.6

[56] References Cited

U.S. PATENT DOCUMENTS

| | | | |
|---|---|---|---|
| 3,278,504 | 11/1966 | Eells et al. | 260/88.2 |
| 3,914,365 | 10/1975 | Kim et al. | 264/147 |
| 4,088,805 | 5/1978 | Wiegand | 428/310 |
| 4,144,368 | 3/1979 | Kim et al. | 428/105 |
| 4,211,852 | 7/1980 | Matsuda et al. | 525/240 |

FOREIGN PATENT DOCUMENTS 47-15489  8/1972  Japan .

*Primary Examiner*—Marion McCamish
*Attorney, Agent, or Firm*—Joshua W. Martin, III

[57] ABSTRACT

A family of strong film structures which include unoriented propylene/1-butene copolymer film bonded to oriented polypropylene netting, and a process for making these structures.

11 Claims, 5 Drawing Figures

REINFORCED FILM OF A COMBINATION OF THERMOPLASTIC NETTING AND ORIENTED FILM

BACKGROUND OF THE INVENTION

This invention relates generally to reinforced film and, particularly to a family of reinforced film structures which are formed by combining unoriented thermoplastic copolymer films and oriented polypropylene netting by lamination or by extrusion coating. The film of this invention has a unique combination of properties including strength and tear resistance.

DESCRIPTION OF THE PRIOR ART

It is known to laminate or extrusion coat woven or nonwoven fabrics with thermoplastic films to increase their resistance to moisture and gas permeability and to obtain a reinforced film. However, in the case of polypropylene fabrics and netting, most thermoplastic materials which were previously known to adhere well to the polypropylene fabrics, such as low molecular weight polypropylene and copolymers or graft polymers of polypropylene, cause excessive shrinkage and destortion of the fabrics or netting at the temperature required for bonding. In polypropylene fabrics and netting the polypropylene components are oriented and will shrink or become distorted on exposure to the high temperatures required to coat or laminate them with molten polypropylene or modified polypropylenes previously known to adhere well to such structures. It has now been discovered that crystalline random copolymers of propylene and 1-butene, melting low enough so that such fabric distortion can be avoided in preparing such laminated structures, will adhere well to polypropylene. Use of such copolymers, therefore, makes possible preparation of reinforced film or impervious polypropylene fabric structures by a practical process.

SUMMARY OF INVENTION

This invention includes a reinforced film structure, which can be characterized as a gas and moisture resistant fabric, having a first layer of oriented polypropylene netting or fabric, a second layer of unoriented random copolymer film which consists of a copolymer having between about 7% and 30% of 1-butene and between about 93% and 70% of propylene, wherein the copolymer has an intrinsic viscosity of between 1.1 and 4.0, the two layers being bonded together to form a reinforced film or moisture resistant fabric. Alternatively, a third layer of oriented polypropylene netting or fabric prepared from oriented polypropylene fibers may be employed, being bonded to the first layer of such structure by the random copolymer film. When two layers of oriented netting are employed, preferably each netting layer has main filaments in one direction and smaller connecting filaments in the opposite direction, the main filaments of one of the netting layers being essentially perpendicular to the main filaments of the other netting layer. The invention also includes a process for making this reinforced film by lamination or extrusion coating techniques.

DESCRIPTION OF THE INVENTION

Figure 1:
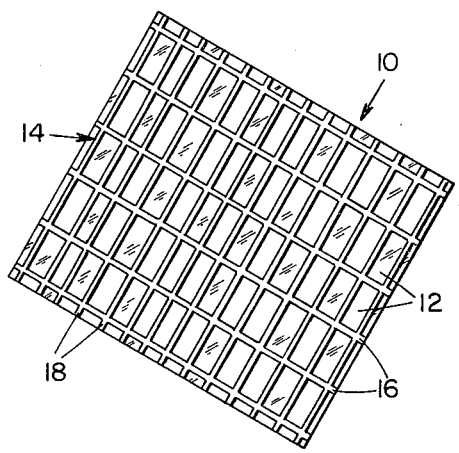
FIG. 1 is a schematic fragmentary perspective of a reinforced film embodying the features of this invention.

Referring to the drawings in detail, there is illustrated in FIG. 1 a reinforced film 10 in the form of a laminate which is a product of this invention. The embodiment of FIG. 1 depicts a layer of oriented polypropylene netting 14 and a layer of propylene/1-butene copolymer film 12. Netting layer 14 has main filaments 16 and tie filaments 18. To provide the requisite strength and reduced moisture and gas permeability, in accordance with the invention the netting is bonded to the thin unoriented thermoplastic film prepared from a copolymer of propylene and 1-butene. Combining layers 12 and 14 in a continuous manner can provide a product that is suitable for the following applications; bagging, other packaging applications, tarpaulins, geotextiles, etc.

Figure 2:
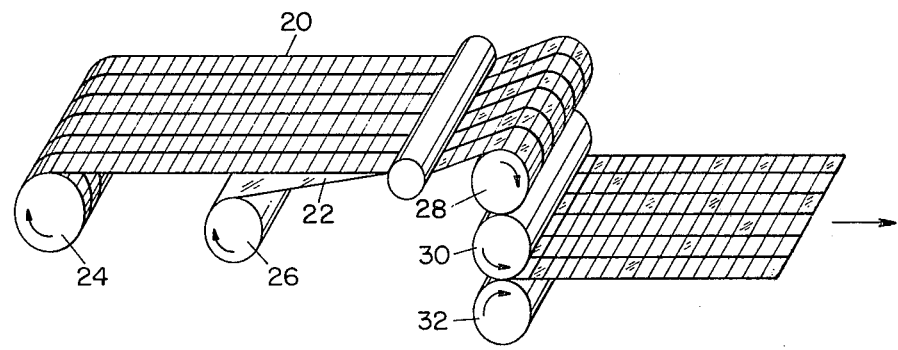
FIG. 2 is a schematic perspective view illustrating apparatus for making reinforced film structures in accordance with the principles of this invention.

FIG. 2 shows schematically a process for continuously preparing the reinforced film shown in FIG. 1. In FIG. 2 there is shown a polypropylene netting layer 20 and a layer of unoriented thermoplastic copolymer film 22 being fed from supply rolls 24 and 26, respectively. In a preferred embodiment of the process of this invention, rolls 28 and 30 are made of steel covered with a Teflon ® polymer-glass cloth. Roll 32 is a steel roll covered with silicone rubber. The first two rolls are heated to a temperature within the range of 100° C. to 150° C.

Figure 3:
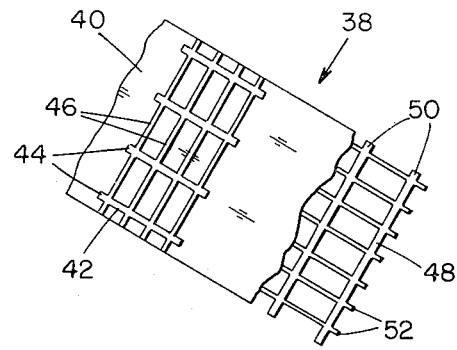
FIG. 3 is a fragmentary perspective view, showing an additional embodiment of the present invention.

FIG. 3 shows another embodiment of the subject invention where a three layer structure 38 is shown. The interlayer 40 represents an unoriented thermoplastic propylene/1-butene copolymer film. Outer layer 42 is a layer of polypropylene nonwoven netting having main filaments 44 and tie filaments 46 which are orthogonal to main filaments 44. The other outer layer 48 also consists of a polypropylene nonwoven netting. Layer 48 has main filaments 50 and tie filaments 52 which are orthogonal to main filaments 50. Outer layer 42 and 48 are orthogonally oriented with respect to each other wherein, for example, the main filaments 44 of outer layer 42 are at a 90 degree angle to the main filaments 50 of outer layer 48. Since the main filaments of the nonwoven netting layers may have higher strength properties as compared to the respective tie filaments, the orientation of layers 42 and 48 in laminate structure 38 can provide substantially enhanced strength characteristics.

Figure 4:
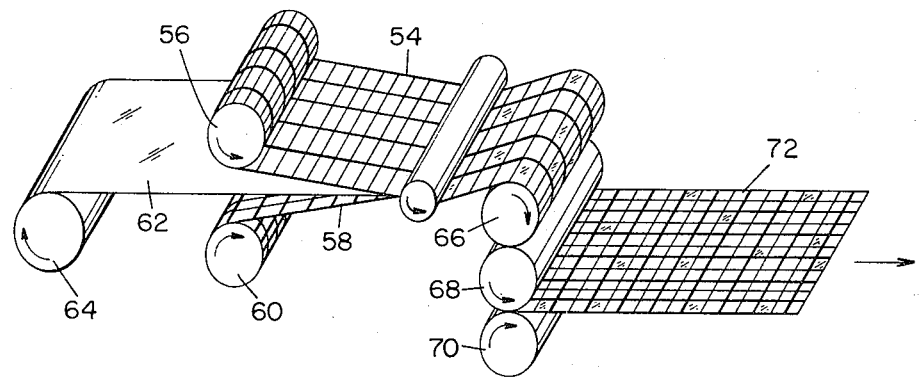
FIG. 4 is a schematic perspective view illustrating other apparatus for making reinforced film in accordance with the principles of this invention.

FIG. 4 shows, schematically, a process which can be used for the manufacture of the reinforced film shown in FIG. 3. If a structure similar to that of FIG. 3 is desired, netting layer 54 would be supplied from supply roll 56. Netting layer 58, having its main and tie filaments at a 90 degree angle to the main and tie filaments of layer 54, respectively, is fed from supply roll 60. Unoriented thermoplastic film 62 is fed from supply roll 64 to form the bonding member of the laminate. Optionally, unoriented film 62 can be supplied directly from an extruder. The three layers pass over heated roll 66, into the nip of heated pressure rolls 68 and 70 wherein the three layers are bonded together. The reinforced film 72 then is fed to a take-up spool (not shown).

Typically, the process shown in FIG. 4, utilizes temperatures of the first two rolls between 100° C. and 150° C., at nip pressures between 50 and 500 pounds per inch. Such a lamination process can also be carried out in a compression press at temperatures in the same range and at moderate pressures, i.e. over 10 p.s.i. for short periods of time such as 10 seconds or more.

Optionally, a reinforced film can be produced which has a layer of netting between two layers of film. Such a reinforced structure might be useful as a trash bag.

Figure 5:
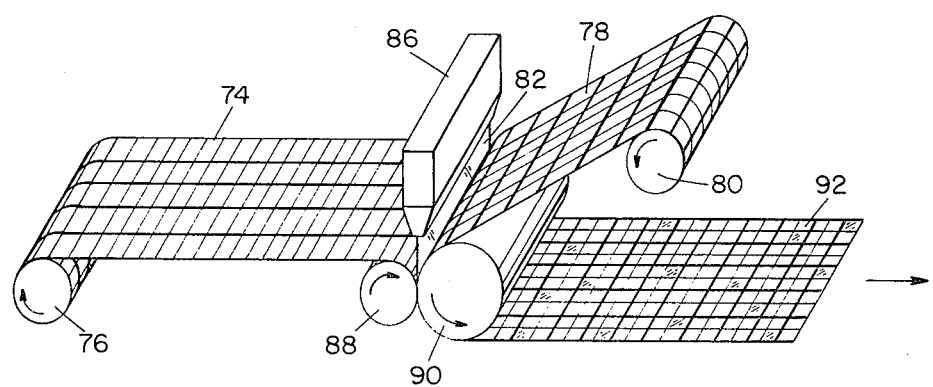
FIG. 5 is a schematic perspective view illustrating an extrusion coating process in accordance with the principles of this invention.

FIG. 5 shows a preferred method for preparing a three layer structure, involving two layers of oriented polypropylene netting bonded to a propylene/1-butene copolymer. This method includes extruding the copolymer as a sheet between two layers of netting and bonding the netting to the copolymer sheet in the nip of the two rolls. As shown in FIG. 5, netting layer 74 is supplied from supply roll 76. Netting layer 78, is fed from supply roll 80. Unoriented polypropylene film 82 is supplied from extruder (not shown) through die 86. The film 82 contacts netting layers 74 and 78 in the nip created by counter-rotating rolls 88 and 90. Roll 88 is preferably made of rubber and coated with Teflon ® polymer. The temperature of roll 88 and chill roll 90 should be below 150° C. to avoid shrinkage or distortion of the netting layers and to effect cooling of the film after it is bonded to the layers of netting. The extrusion temperature should be above the crystalline melting point of the copolymer and may be as high as 250° C. A moderate nip pressure, e.g., in excess of 5 p.s.i., between rolls 88 and 90, is desirable to provide effective contact between the three layers of the composite structure. The product of the extrusion coating lamination 92 is fed to a take-up spool (not shown).

A similar extrusion coating lamination process can be used to form a two-layer structure consisting of a copolymer sheet extruded onto a single layer of netting.

The thermoplastic film used in this invention, is formed from a copolymer of propylene and 1-butene containing approximate 7% to 30% 1-butene. This copolymer provides excellent adhesion between two layers of oriented polypropylene netting at temperatures which do not cause a significant loss of orientation of the polypropylene. The preferred materials are random 1-butene/propylene copolymers which have crystalline melting points significantly below the crystalline melting points of polypropylene homopolymers, random ethylenepropylene copolymers containing up to 10% ethylene or block copolymers containing up to 25% ethylene. The $C_3$-$C_4$ copolymers are compatible with and adhere well to polypropylene and $C_2$-$C_3$ copolymers and thus form an extremely good bond, without requiring melting or loss of orientation of the propylene homopolymers or $C_2$-$C_3$ copolymers. Preferably the 1-butene content may range from 8 to 20%. The crystalline melting points of the copolymer containing 8% butene is about 140° C., while the copolymer containing 18% butene has a crystalline melting point of about 130° C. The thermoplastic copolymer film should have a thickness between about 0.25 and 4 mil, preferably between about 0.25 mils and 2 mil.

The oriented polypropylene netting or network structures used in this invention may be of the types disclosed in the prior art. For example, Mercer (U.S. Pat. Nos. 4,020,208 and 4,059,713); Larsen (4,152,479); Kim et al (3,914,365 and 4,144,368); and Liu (4,140,826).

This netting may be composed of either a polypropylene homopolymer, a propylene-ethylene random copolymer containing 2% to 10% ethylene or a propylene-ethylene block copolymer containing 2% to 25% ethylene and may be either natural or pigmented.

Preferably the netting should have uniform network structure and the hole size, spacing and design of the two nets in a laminate should be similar. Uniform network structure means that in each layer of netting, there are at least two sets of strands wherein each set of strands crosses another set of strands at a fixed angle and the openings in the netting are uniformly sized. Preferably, the average minimum dimension of the openings in each layer of netting is between 0.5 millimeters and 5 millimeters. Preferred types of thermoplastic netting useful in this invention are disclosed in U.S. Pat. Nos. 4,144,368 and 4,207,375 to Kim et al, incorporated herein by reference.

The network structure used in this invention may include one or more layers of netting. When two or more layers of netting are employed, the netting may have the same or different configurations such that the main filaments cross in various directions to provide a multilayer product having certain desired strength characteristics. For example, orthogonal constructions can be made wherein the main filaments of one layer cross at 90° to the main filaments of another layer to provide high strength and tear resistance in two directions. Structures may also be made from three or more layers of network, each having the main filaments in different directions thus providing laminates having excellent dimensional stability, high strength and tear resistance in all directions and high burst strength.

Having set forth the general nature of the invention, the following examples illustrate some specific embodiments of the invention. It is to be understood, however, that this invention is not limited to these examples since the invention may be practiced by the use of various modifications.

EXAMPLE 1

In this example, the netting components were of polypropylene and were in the form of linearly oriented continuous filament orthogonal networks. Two layers of the same type of netting were used in each test, one with strength primarily in the machine direction (MD) and one with strength primarily in the cross-machine direction (TD). The film used in this example was made from a propylene/1-butene copolymer containing 14% butene, and having an intrinsic viscosity of 1.1. The film had a thickness of 2 mil. The netting layers and the film were arranged to produce the laminate structure shown in FIG. 3.

The polypropylene netting employed had main filaments 150 microns in diameter and tie filaments 25 microns in diameter. There were 5 main filaments per centimeter and 10 tie filaments per centimeter so that the openings in the nets were about 1.3 by 1.2 millimeters across in the two perpendicular directions. These nets had a weight of 20 grams per square meter. The Frazier air permeability of the netting was 1144 ft$^3$/min/ft$^2$ (CFM).

This three layer structure was heated in a platen press at 120° C. under 38 p.s.i. pressure for 30 seconds. The product so prepared was a strong reinforced film, resistant to the passage of gas or liquids. A 180° T-peel test made according to ASTM D1876, giving a value of 3 pounds per inch, showed that effective adhesion of the two netting layers was obtained.

EXAMPLE 2

This example illustrates preparation of a reinforced film by extrusion coating of a propylene/1-butene copolymer containing 14% 1-butene onto a single layer of oriented polypropylene netting. The netting employed was of the type used in Example 1, having main filaments oriented in the machine direction. The netting layer was 18 inches wide. Using a 2½ inch diameter plastic extruder with a 24:1 length to diameter ratio and with a coathanger die 18 inches wide, a random copolymer containing 8% 1-butene and 92% propylene with an intrinsic viscosity of 1.9 was extruded at 235° C. The 2 mil thick film so extruded contacted the netting layer at the nip between two 6 inch diameter rolls which were two feet long. The roll corresponding to roll 88 in FIG. 5 was heated to 50° C. The other roll, corresponding to chill roll 90 in FIG. 5, was heated to 30° C. The pressure between the rolls was 10 pounds per inch. The coated netting was wound onto a take-up roll. The product was a reinforced film, resistant to the passage of gas and liquid, which was puncture and tear resistant.

It is to be understood that the above description, drawing and examples are illustrative of this invention and not in limitation thereof. As will be evident to those skilled in the art, various modifications can be made in light of the foregoing disclosure and discussion without departure from the spirit or scope of the disclosure or from the scope of the claims.

What I claim and desire to protect by Letters Patent is:

1. A tear resistant reinforced film comprising:
   a first layer of oriented polypropylene netting,
   a second layer of random copolymer film consisting essentially of a copolymer having between about 7% to 30% of 1-butene and between about 93% to 70% of propylene, the copolymer of said film having an intrinsic viscosity of between about 1.1 and 4.0,
   said first and second layers being bonded together to form a reinforced film.

2. A reinforced film of claim 1 wherein said first layer comprises a network structure having a plurality of parallel continuous main filaments extending in a first direction and having a substantially uniform cross-section and being substantially uniformly and continuously oriented, and a plurality of discontinuous parallel tie filaments extending in a second direction different from said first direction, said tie filaments interconnecting said main filaments and having no substantial portion thereof crossing over said main filaments, each of said tie filaments between each pair of adjacent main filaments having its longitudinal axis in said second direction in axial alignment with the longitudinal axis in said second direction of the adjacent tie filament.

3. The reinforced film structure of claims 1 or 2 wherein the average minimum dimension of each of the openings of the netting in said first layer is between about 0.5 millimeters and 5 millimeters.

4. A reinforced film as in claim 1 wherein said first layer comprises a network structure having a plurality of parallel continuous solid main filaments extending in a first direction and having a substantially uniform cross section and being substantially uniformly and continuously oriented, and a plurality of parallel solid tie filaments extending continuously across said main filaments in a second direction different from said first direction and having a cross-section thereof smaller than the cross-section of said filaments.

5. A reinforced film comprising:
   a first layer of oriented polypropylene netting,
   a second layer of random copolymer film consisting essentially of a copolymer having between about 7% to about 30% 1-butene and between about 93% and 70% propylene, the copolymer of said film having an intrinsic viscosity of between about 1.1 and 4.0,
   a third layer of oriented polypropylene netting,
   said first, second and third layers being bonded together with said second layer substantially between said first and third layers to form a reinforced film.

6. A reinforced film as in claim 5 wherein said first layer comprises a first network structure having a plurality of parallel continuous main filaments extending in a first direction and having a substantially uniform cross-section and being substantially uniformly and continuously oriented, and a plurality of discontinuous parallel tie filaments extending in a second direction different from said first direction, said tie filaments interconnecting said main filaments and having no substantial portion thereof crossing over said main filaments, each of said tie filaments between each pair of adjacent main filaments having its longitudinal axis in said second direction in axial alignment with the longitudinal axis in said second direction of the adjacent tie filament, and
   wherein said third layer is a second network structure having a plurality of parallel continuous main filaments extending in a third direction different from said first direction and having a substantially uniform cross-section and being substantially uniformly and continuously oriented, and a plurality of parallel tie filaments extending in a direction other than said third direction, said tie filaments interconnecting said main filaments and having no substantial portion thereof crossing over said main filaments, each of said tie filaments between each pair of adjacent main filaments having a longitudinal axis in a fourth direction in axial alignment with the longitudinal axis in said fourth direction of the adjacent tie filaments.

7. A reinforced film as in claim 6 wherein said first direction is parallel to the longitudinal axis of said first network structure and said third direction is perpendicular to said first direction.

8. Process of making a tear resistant reinforced film comprising:
   interposing a layer of film between a first and second layer of oriented polypropylene netting, said layer of film having a thickness between about 0.25 mils to 4 mil and consisting essentially of a random copolymer having between about 7% to about 30% of 1-butene and between about 93% to 70% propylene, said copolymer having an intrinsic viscosity of between about 1.1 and 4.0,
   applying pressure and heat to said layers of netting and film, said heat being applied at a temperature between about 100° C. and 150° C.

9. A process of making a tear-resistant reinforced film comprising:
   placing a first layer of film adjacent to a second layer of oriented polypropylene netting, said first layer of film having a thickness between about 0.25 mils to 2.0 mil and consisting essentially of a random copolymer having between about 7% to about 30% of 1-butene and between about 93% to 70% propylene, said copolymer having an intrinsic viscosity of between about 1.1 and 4.0, applying pressure and heat to said layers of netting and film, said heat being applied at a temperature between about 100° C. and 150° C.

10. The process of claims 8 or 9 wherein said random copolymer contains between about 10% to about 16% 1-butene.

11. A reinforced film comprising:

a first layer of random copolymer film, a second layer of oriented polypropylene netting, a third layer of random copolymer film, said first and third layers of random copolymer film each consisting essentially of a copolymer having between about 7% to about 30% 1-butene and between about 93% and 70% propylene, the copolymer of said film having an intrinsic viscosity of between about 1.1 and 4.0, said first, second and third layers being bonded together with said second layer substantially between said first and third layers to form a tear resistant reinforced film.

* * * * *